United States Patent [19]

Partus

[11] 4,278,459

[45] Jul. 14, 1981

[54] METHOD AND APPARATUS FOR EXHAUSTING OPTICAL FIBER PREFORM TUBES

[75] Inventor: Fred P. Partus, Atlanta, Ga.

[73] Assignee: Western Electric Company, Inc., New York, N.Y.

[21] Appl. No.: 126,605

[22] Filed: Mar. 3, 1980

[51] Int. Cl.³ .................... C03C 25/02; C03B 37/00
[52] U.S. Cl. ........................... 65/18; 65/3 A; 65/11 W; 65/13; 65/144
[58] Field of Search ............... 65/3 A, 11 W, 13, 18, 65/144

[56] References Cited

U.S. PATENT DOCUMENTS

| | | | |
|---|---|---|---|
| 4,009,014 | 2/1977 | Black et al. | 65/3 A |
| 4,117,802 | 10/1978 | Sergent | 65/3 A X |
| 4,154,591 | 5/1979 | French et al. | 65/13 X |
| 4,165,224 | 8/1979 | Irven et al. | 65/3 A |
| 4,233,045 | 11/1980 | Sarkar | 65/3 A |

Primary Examiner—Robert L. Lindsay, Jr.
Attorney, Agent, or Firm—Robert B. Kennedy

[57] ABSTRACT

Methods and apparatuses are disclosed for exhausting reaction products from an optical fiber preform tube and for choking off the preform tube during collapse wherein an exhaust tube (40) is provided with an entry end (41) located adjacent and in fluid communication with a downstream end (10′) of a preform tube (10), suction applied to the exhaust tube (40), and a stream of reaction product agitating gas free of reaction products introduced into the exhaust tube (40) at a location adjacent the exhaust tube entry end (41).

16 Claims, 7 Drawing Figures

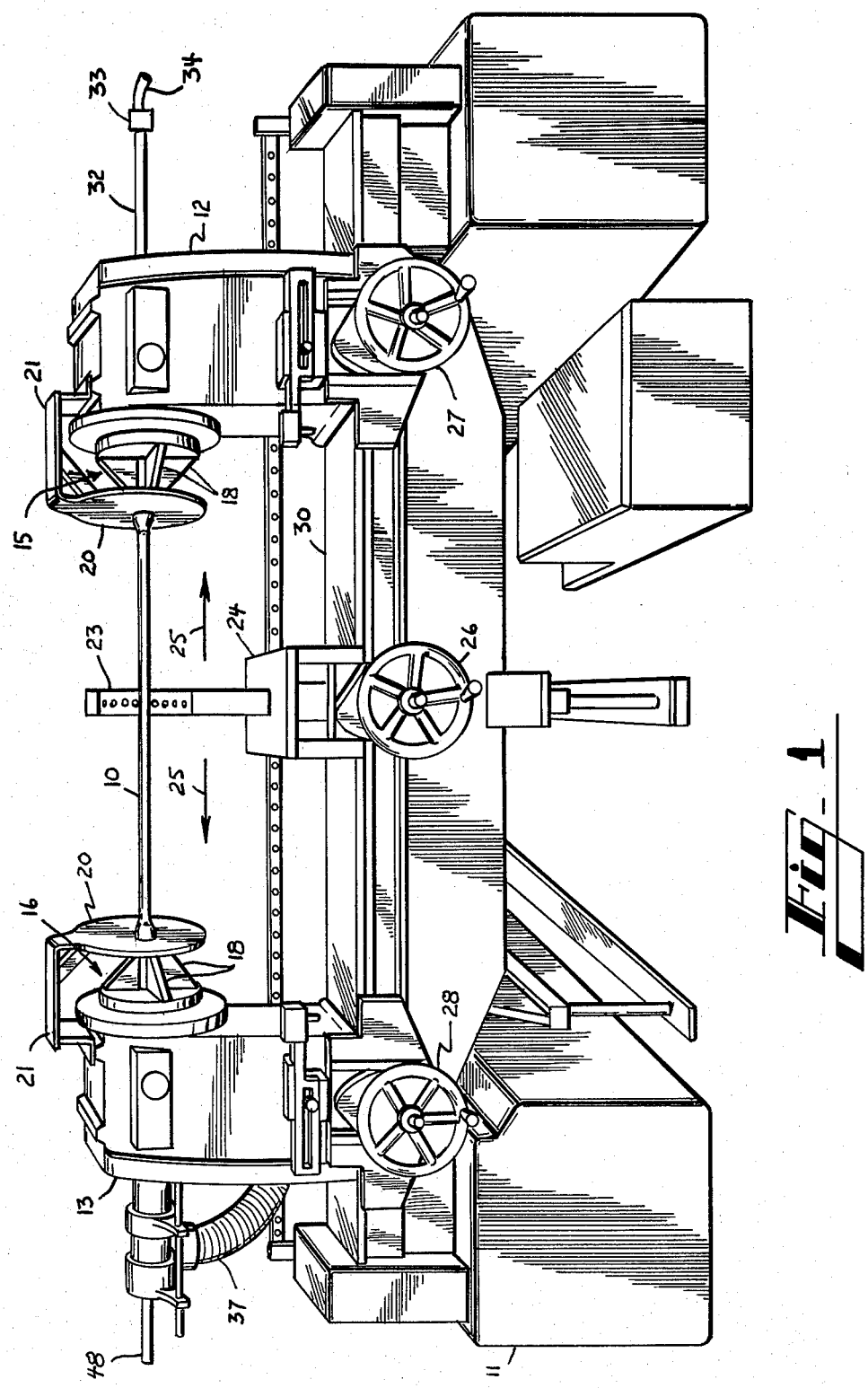

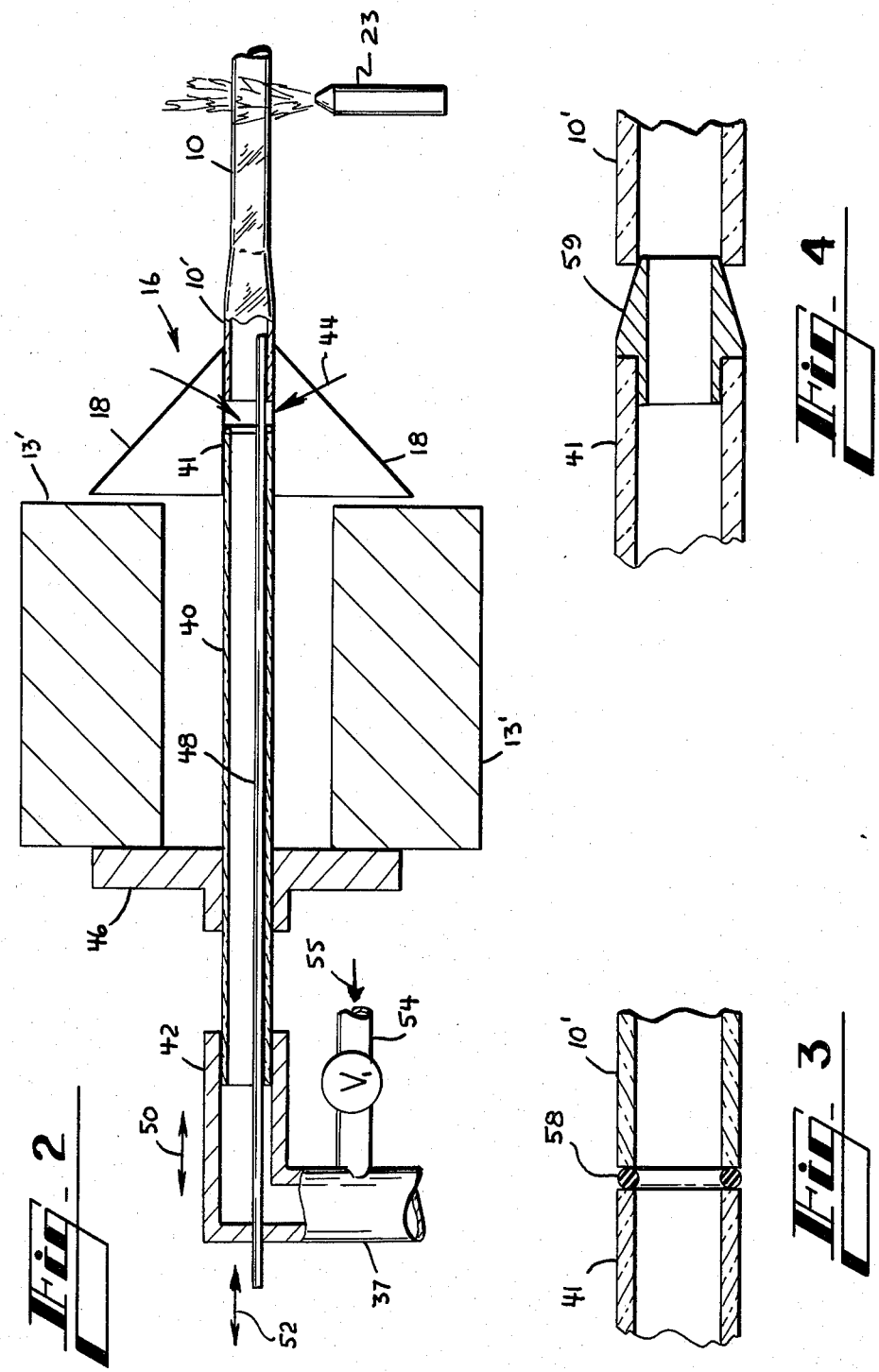

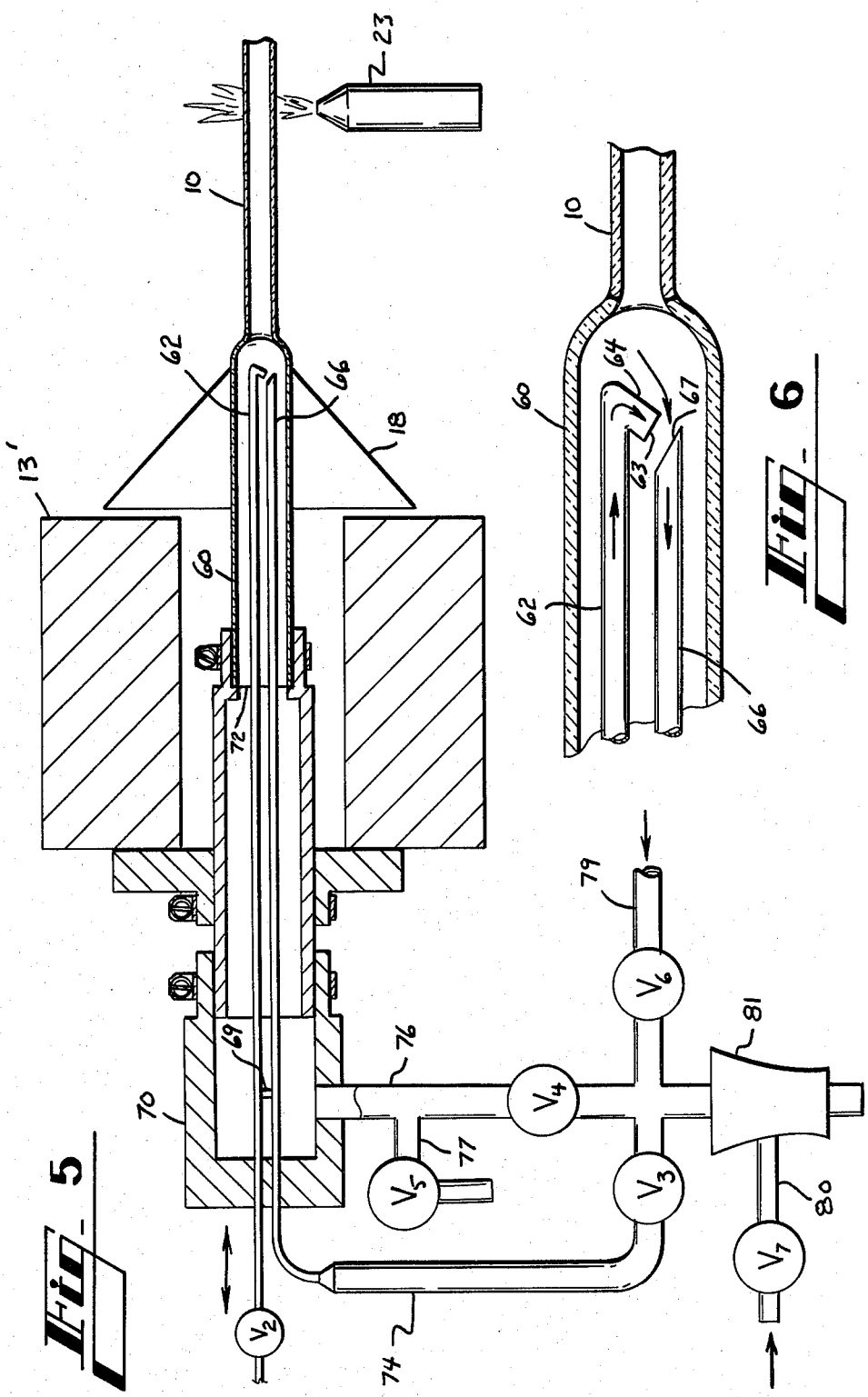

METHOD AND APPARATUS FOR EXHAUSTING OPTICAL FIBER PREFORM TUBES

TECHNICAL FIELD

This application relates generally to methods and apparatuses for exhausting reaction products from optical fiber preform tubes.

BACKGROUND OF THE INVENTION

In constructing preforms from which optical fibers may be drawn, vapors of materials such as $SiCl_4$, $GeCl_4$ and $POCl_3$ are entrained in a carrier gas such as oxygen and drawn as a vapor stream into the interior of a glass preform tube. The preform tube is rotated while a torch repeatedly traverses its length. As the vapor stream passes through the tube and encounters the band of heat adjacent the torch it reacts creating oxides which deposit on the interior surface of the tube. After numerous torch passes have formed numerous deposition layers the tube is collapsed into a solid rod-shaped preform.

During the just described procedure, commonly termed the modified chemical vapor deposition process, not all of the reaction products are deposited within the preform tube. Some rather are exhausted from the tube in a powdery form along with exiting carrier gas. Heretofore these undeposited reaction products have been conveyed from the preform tube through an exhaust tube of larger diameter than the preform tube formed as an integral extension of the preform tube. During the vapor deposition process, however, which ordinarily lasts for a number of hours, some of the powdery reaction products exhausted from the preform tube deposit on and accumulate within the exhaust tube. This accumulation forms a progressively increasing restriction to the flow of fluids and other reaction products later passed through the exhaust tube which in turn affects the pressure of the vapor stream within the preform tube itself. Very small changes in pressure and flow pattern at the exit end of the preform tube can substantially effect the deposition process as it is imperative that the vapors be delivered to the preform tube at precisely controlled mass flow rates. Thus, this progressively increasing restriction and changes in flow pattern within the exhaust tube adversely affects the deposition process since it is unpredictable and uncontrolled.

In an effort to alleviate the just described problems scraper rods have been laid within the exhaust tubes which continuously gravitate to the lower portion of the tube during its rotation. This has served to agitate and shake loose some of the reaction products that have deposited and accumulated on the interior walls of the exhaust tube thereby enabling the product to be withdrawn by the vapor stream. Periodically the scraper rod has also been manually moved about in both axial and radial directions in order to augment cleaning of the inside of the exhaust tube by scrapping the powdery product that may have accumulated at the throat area where the exhaust tube is joined to the preform tube as well as in the exhaust tube. This approach however, though providing improved results, has still not prevented reaction product from accumulating to such a degree as to affect the rate of the deposition process significantly. Even when agitated the products tend to diffuse upstream to some degree creating anomalies in the deposition layers. Furthermore, it has proven to be quite a tedious process to form the exhaust tube unitarily with the preform tube with precise axial alignment.

An additional problem associated with prior art preform tube exhaust systems arises during the collapse phase of the modified chemical vapor deposition process. During this period it is necessary to provide positive pressure within the collapsing preform tube in order to maintain roundness. Though there are other less desirable ways in which to do this, the best way has been to build up back pressure by sealing off the downstream end of the tube. This has been done by either holding the torch at the juncture of the preform and exhaust tubes until a seal is formed or by inserting a plug into the exhaust tube. This however means having to stop the lathe used in heating and rotating the tubes, manually removing the scraper rod and inserting a plug, all of which restricts manufacturing efficiency. Accordingly, it is to these problems to which the present invention is primarily directed.

SUMMARY OF THE INVENTION

In one form of the invention a method is provided for exhausting reaction products from an optical fiber preform tube into which vapors are introduced and entrained with a carrier gas for chemical reaction and deposition. The method comprises the steps of providing an exhaust tube with an entry end located adjacent and in fluid communication with the downstream end of the preform tube, applying suction to the exhaust tube, and introducing a stream of reaction product agitating gas substantially free of vapor deposition reaction products into the exhaust tube at a location adjacent the exhaust tube entry end.

In another preferred form of the invention, apparatus is provided for exhausting reaction products from an optical fiber preform tube into which vapors are introduced and entrained with a carrier gas for chemical reaction and deposition. The apparatus comprises an exhaust tube having an entry end mounted adjacent the downstream end of the preform tube, means for drawing reaction products from the preform tube into the exhaust tube through the entry end, and means for introducing a reaction product agitating stream of gas substantially free of vapor deposition reaction products into the exhaust tube at a location adjacent the entry end.

In yet another preferred form of the invention apparatus is provided for exhausting reaction products from an optical fiber preform tube having an end rigidly secured in a chuck rotatably supported on a lathe frame. The apparatus comprises an exhaust tube mounted to the lathe frame with an end position within the rotatable chuck spaced by a gap from the preform tube, and means for drawing reaction products from the preform tube into the exhaust tube and for drawing ambient air into the exhaust tube through the gap to agitate the flow of reaction products as they traverse the gap and enter the exhaust tube.

BRIEF DESCRIPTION OF THE DRAWINGS

FIG. 1 is a perspective view of a lathe to which an optical fiber preform tube is mounted for chemical vapor deposition.

FIG. 2 is a cross-sectional view of apparatus for exhausting an optical fiber preform tube in accordance with the present invention.

FIG. 3 is an enlarged cross-sectional view of confronting end portions of the exhaust tube and preform tube shown in FIG. 2 when translated into mutual abutment.

FIG. 4 is a cross-sectional view of the confronting end portions of the exhaust and preform tubes together with a seal of alternate configuration from that illustrated in FIG. 3.

FIG. 5 is a cross-sectional view of apparatus for exhausting a preform tube which embodies principles of the invention in an alternative form.

FIG. 6 is an enlarged cross-sectional view of an end portion of the exhaust tube shown in FIG. 5.

DETAILED DESCRIPTION

Figure 7:
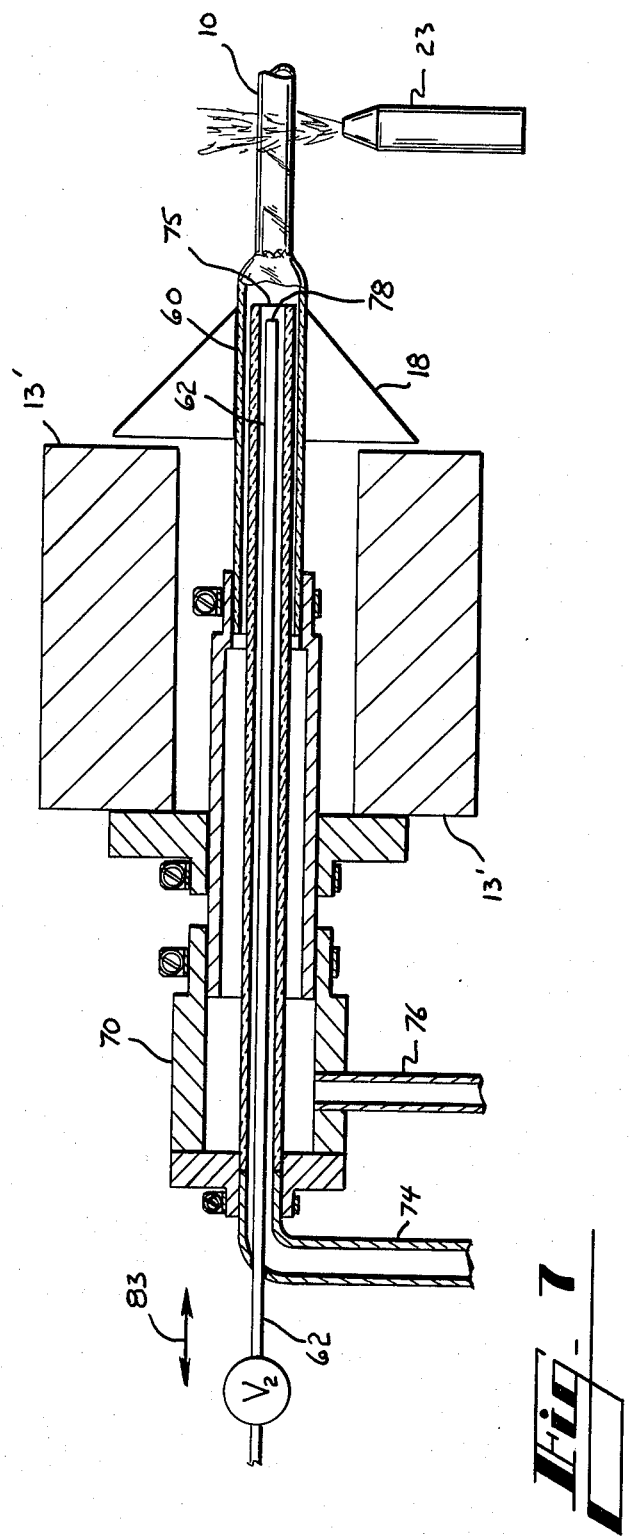
FIG. 7 is a cross-sectional view of apparatus for exhausting a preform tube in still another preferred form.

Referring now in more detail to the drawing, there is shown in FIG. 1 a lathe for forming an optical fiber preform by the modified chemical vapor deposition process of depositing vapors on the interior surface of a glass preform tube 10. The lathe includes a frame 11 atop which a headstock 12 and a tailstock 13 are mounted. The headstock 12 and its internal mechanisms rotatably support and drive a chuck 15 while the tailstock 13 and its internal mechanisms similarly rotatably support and drive chuck 16 about a common axis with that of chuck 15. Each of the chucks is comprised of radially spaced jaws 18 which are adapted to be moved into and out of gripping engagement with the preform tube or with a tubular extension thereof. Centrally apertured heat shields 20 are mounted by pendants 21 to both stocks closely adjacent the rotatable chucks. A hydrogen-oxygen torch 23 is mounted atop a carriage 24 for reciprocal movement between the two heat shields 20 as indicated by arrows 25. The torch 23 is reciprocated by an unshown automated drive mechanism which can be manually over-ridden and positioned by a handwheel 26. Similarly, the lateral position of the headstock 12 may be adjusted by a handwheel 27 atop a rail 30 while the position of the tailstock may be manually adjusted over the rail by movement of handwheel 28. A conduit 32 projects laterally from the headstock 12 to a rotary seal 33 from which a stationary conduit 34 extends to an unshown vapor stream supply source. An exhaust hose 37 extends from the tailstock.

Referring next to FIGS. 2 to 4 the preform tube 10 is shown having a slightly larger tube end 10' rigidly mounted within the jaws 18 of lathe chuck 16 rotatably supported by the tailstock shown diagramatically at 13'. An exhaust tube 40 is mounted to a manifold 42 with tube end 41 positioned within the rotatable chuck 18 adjacent to but spaced by a gap 44 slightly from the end 10' of the preform tube. The exhaust tube 40 is also supported in an rotatable support number 46 of the tailstock intermediate the two tube ends. The various fittings of the exhaust tube may be such as either to allow it to spin or to remain stationary as the chuck rotates the preform tube 10 as long as movements of the manifold 42 are translated into accompanying movements of the exhaust tube as indicated by arrows 50. A scraper rod 48 is laid within the exhaust tube 40 with one end spanning gap 44 to rest within preform tube end 10' while its other end extends out of the manifold 42. Unshown drive means also provided for reciprocally moving the manifold housing 42 and the exhaust tube 40 in the direction indicated by arrow 50. Drive means may also be provided for moving the scraper rod 48 in the general directions indicated by arrows 52. An auxiliary exhaust tube 54 communicates with the exhaust tube 37 through a valve $V_1$ into which fluid is selectively drawn as indicated by arrow 55 as is later explained in more detail.

The end 41 of the exhaust tube is provided with means for effecting a fluid tight seal upon being repositioned by movement of the manifold 42 into abutment with the end 10' of the preform tube. In FIG. 3 this sealing means is seen to be in the form of a resilient O-ring 58 which is afixed to the end 41 of the exhaust tube. In FIG. 4 the seal is shown in an alternative form of a conically tapered end member 59 rigidly secured to the exhaust tube end 41. This end member 59 tapers to a outside diameter slightly less than the inside diameter of the preform tube end 10' so that a small end portion of it may be telescopically received with the preform tube end.

During chemical vapor deposition the preform tube 10 is rotated by chucks 15 and 16 while the exhaust tube 40 is held spaced by gap 44 from the rotating preform tube. A stream of vapors entrained with a carrier gas is forced into the preform tube 10 by positive pressure provided by the vapor stream generator. As the vapor stream is passed through the preform tube the torch 23 is slowly moved along the rotating preform tube thereby causing a chemical reaction to occur within the band of heat created and the products of the reaction to be deposited upon the interior surface of the tube. The carrier gas along with any undeposited reaction products are exhausted out of the preform tube end 10' through the exhaust tube 40, through the manifold housing 42, and the exhaust hose 37 to which suction is applied.

As the deposition process progresses a substantial buildup within the end 10' of the preform tube is inhibited by the presence of scraper rod 48 which is continuously gravitating to the bottom of this tube end as the preform tube rotates. In addition, the buildup of reaction product deposits throughout the exhaust tube, and particularly within the exhaust tube end 41, is minimized by the fact that ambient air, free of reaction products, is continuously being drawn into the exhaust tube through the gap 44. This air provides a high velocity fluid which agitates the reaction products traversing the gap and entering the exhaust tube end which tends to purge the exhaust tube. This action is enhanced by the fact that the chuck jaws 18, located radially about the gap, function much as vanes or fan blades. This constant agitation thus inhibits buildup from occuring in the exhaust tube end 41 which, as previously explained, could adversely effect pressures and flow patterns within the preform tube. In addition, the scraper rod 48 may be periodically moved about within the exhaust tube, both in the direction indicated by arrows 52 as well as with a slight stirring motion to remove any reaction products which may have nevertheless managed to form on the tube walls.

After vapor deposition within the preform tube has been completed, the preform tube is collapsed by increasing the heat output applied by the torch 23. Back pressure, in order to maintain roundness, is also then applied by moving the end 41 of the exhaust tube into abutment with the end 10' of the preform tube as shown in FIGS. 3 and 4. At this time the valve $V_1$ as well as other unshown valves may be closed to choke off flow through exhaust hose 37 and to buildup back pressure. Following collapse the preform is removed from the chucks of the headstock and tailstock and the exhaust tube and scrapper rod removed for cleaning.

With reference next to FIGS. 5 and 6 an alternative embodiment is shown wherein an exhaust tube 60 is formed as a unitary extension of preform tube 10. This is the conventional configuration which has heretofore existed wherein the exhaust tube rotates along with the preform tube as chemical vapor deposition occurs. Here, however, means are provided for drawing a gas free of reaction products into the exhaust tube at a location adjacent its throat or juncture with the preform tube. This is done by use of a conduit 62 having an outlet orifice 63 located at the end of a reentrant neck portion 64. Another conduit 66 is provided mounted by a bridge 69 to conduit 62 which has a beveled inlet orifice 67 facing the outlet orifice 63 of conduit 62 and spaced slightly therefrom. This other conduit is connected to a suction tube 74 externally of the manifold housing 70.

So constructed, gas or air may be introduced into the exhaust tube 60 at a location adjacent its juncture with the preform tube 10 and then withdrawn from this same general location through the conduit 66. The gas or air, of course, initially enters into the end 72 of the exhaust tube distal the preform portion 10 but at that point is still confined within the conduit 62. Thus, for purposes of this application the introduction point is intended to mean that point in which the product agitating gas or air is actually released or withdrawn from the space about the interior surface of the exhaust tube.

A system of conduits, manifolds and valves is associated with the exhaust apparatus which includes valve $V_2$ which controls the rate of reaction product free gas flow into the exhaust tube through conduit 62, and a valve $V_3$ which controls the withdrawal rate of the gas or air through conduit 66 and suction tube 74. Periodically, such as every tenth pass of torch 23 over the preform tube, the valves $V_2$, $V_4$ and $V_5$ may be selectively actuated to create a pulsing stream of gas at the interface of the exhaust tube 60 with the preform tube 10 for further agitation. Valves $V_4$ and $V_5$ are provided in an exhaust hose 76 to control the suction applied to the exhaust tube 60 which valves are also periodically cycled in conjunction with the operations of valves $V_2$, $V_5$ and $V_6$ for cleaning of the housing 70.

The valve $V_6$ is provided in another branch line 79 which communicates with a source of compressed air to increase the velocity of fluid flow through a transvector 81 and to control suction at valves $V_4$, $V_5$ and $V_6$. A control line 80 with valve $V_7$ communicates conventionally with the transvector whereby a slight change in flow rate through $V_7$ effects a substantial change in flow rate through the transvector. The just described network of conduits, valves, supply lines, supply gases thus provides substantial suction of the stream of fluids flowing through the exhaust tube during deposition.

A variation on the system of FIGS. 5 and 6 is shown in FIG. 7 wherein a conduit 74 is provided with an open end or orifice 75 located adjacent the juncture of the exhaust tube 60 with the preform tube 10. This conduit extends through the exhaust tube 60 and through housing 70 to the exterior thereof. Another conduit 62 located within the tube 74 which has an outlet orifice 78 located adjacent the orifice 75 of the conduit 74. The location of the orifice can be periodically adjusted as indicated by arrows 83 to break loose any particular accumulation of reaction product that might be observed in this area. If desired, this embodiment may be altered by eliminating the conduit 74 whereupon exhaust would be normally controlled through conduit 76 which otherwise is merely employed in periodically cleaning out the housing 70. In that case the exhaust tube 60 would preferably assume the same diameter as the preform tube for improved temperature control.

It thus is seen that apparatuses and methods are provided for exhausting reaction products from preform tubes during vapor deposition. Surprisingly, it provides the ability both to cleanse associated exhaust tubes and housings as well as to seal them off periodically so as to establish back pressure during preform collapse and for automatically choking off the preform tube during collapse. It should be understood however that the described embodiments merely illustrate principles of the invention in selected, preferred forms. Many modifications, additions, and deletions may, of course, be made thereto without departure from the spirit and scope of the invention as set forth in the following claims.

What is claimed is:

1. A method of exhausting reaction products from an optical fiber preform tube into which through an upstream tube end vapors are introduced entrained with a carrier gas for chemical reaction and deposition, and with the method comprising the steps of providing an exhaust tube with an entry end located adjacent and in fluid communication with a downstream end of the preform tube; applying suction to the exhaust tube; and introducing a stream of reaction product agitating gas substantially free of vapor deposition reaction products into the exhaust tube at a location adjacent the exhaust tube entry end.

2. The method of exhausting vapor deposition reaction products in accordance with claim 1 wherein the exhaust tube entry end is spaced from the preform tube downstream end to define a gap therebetween through which the stream of reaction product agitating gas is drawn in being introducted into the exhaust tube.

3. The method of exhausting vapor deposition reaction products in accordance with claim 2 wherein the gap is subsequently closed to establish back pressure for preform collapse.

4. The method of exhausting vapor deposition reaction products in accordance with claim 2 wherein a scraper rod is laid within the exhaust tube with an end portion at least partially spanning said gap, and wherein the exhaust tube is rotated during chemical reaction and deposition.

5. The method of exhausting vapor deposition reaction products in accordance with claim 1 wherein reaction product agitating gas is withdrawn from the exhaust tube at a location adjacent the exhaust tube entry end.

6. Apparatus for exhausting reaction products from an optical fiber preform tube into which through an upstream tube end vapors are introduced entrained with a carrier gas for chemical reaction and deposition, and with the apparatus comprising an exhaust tube having an entry end mounted adjacent the downstream end of the preform tube; means for forcing reaction products from the preform tube into said exhaust tube through said entry end; and means for introducing a reaction product agitating stream of gas substantially free of vapor deposition reaction products into said exhaust tube at a location adjacent said entry end.

7. Apparatus for exhausting reaction products in accordance with claim 6 wherein said exhaust tube entry end is mounted spaced from the downstream end of the preform tube to define a gap therebetween through which the stream of reaction product agitating gas is drawn into said exhaust tube.

8. Apparatus for exhausting reaction products in accordance with claim 7 further comprising a scraper rod laid with said exhaust tube with an end portion at least partially spanning said gap.

9. Apparatus for exhausting reaction products in accordance with claim 7 or 8 comprising means for moving said exhaust entry end into abutment with the downstream end of the preform tube temporarily to close said gap and build up back pressure during preform tube collapse operations.

10. Apparatus for exhausting reaction products in accordance with claim 6 comprising means for withdrawing reaction product agitating gas from said exhaust tube at a location adjacent said exhaust tube entry end.

11. Apparatus for exhausting reaction products in accordance with claim 6 wherein said means for introducing a reaction product agitating stream of gas comprises a conduit which extends through said exhaust tube and terminates with an outlet orifice located adjacent said exhaust tube entry end.

12. Apparatus for exhausting reaction products in accordance with claim 11 further comprising a second conduit which extends through said exhaust tube terminating with an inlet orifice located adjacent said exhaust tube entry end, and means for applying suction to said second conduit whereby the reaction product agitating stream of gas introduced into the exhaust tube is drawn out of the exhaust tube through the second conduit.

13. Apparatus for exhausting reaction products from a rotatable optical fiber preform tube having an end rigidly secured in a chuck rotatably supported on a lathe frame, and with the apparatus comprising an exhaust tube mounted to the lathe frame with an end positioned within the rotatable chuck spaced by a gap from the preform tube, and means for drawing reaction products from the preform tube into said exhaust tube and for drawing ambient air into said exhaust tube through said gap to agitate reaction products as they traverse said gap and enter said exhaust tube.

14. Apparatus for exhausting reaction products in accordance with claim 13 further comprising a scraper rod positioned within said exhaust tube and at least partially spanning said gap.

15. Apparatus for exhausting reaction products in accordance with claim 13 comprising means for reciprocally sliding said exhaust tube within the rotatable chuck into and out of abutment with the end of the rotatable preform tube rigidly secured within the chuck.

16. Apparatus for exhausting reaction products in accordance with claim 15 comprising sealing means mounted to the end of said exhaust tube positioned within the rotatable chuck to effect a seal between the preform tube and said exhaust tube upon the exhaust tube being slid into abutment with the rotatable preform tube.

* * * * *